(12) United States Patent
Kellum

(10) Patent No.: US 10,592,087 B1
(45) Date of Patent: Mar. 17, 2020

(54) SYSTEM AND METHOD FOR CREATING FLUID DESIGN KEYFRAMES ON GRAPHICAL USER INTERFACE

(71) Applicant: Scott Kellum, Arlington, VA (US)

(72) Inventor: Scott Kellum, Arlington, VA (US)

(73) Assignee: TYPETURA LLC, Arlington, VA (US)

( * ) Notice: Subject to any disclaimer, the term of this patent is extended or adjusted under 35 U.S.C. 154(b) by 0 days.

(21) Appl. No.: 16/167,191

(22) Filed: Oct. 22, 2018

(51) Int. Cl.
*G06F 17/50* (2006.01)
*G06F 3/048* (2013.01)
*G06F 3/0484* (2013.01)
*G06F 9/451* (2018.01)

(52) U.S. Cl.
CPC .......... *G06F 3/04847* (2013.01); *G06F 9/451* (2018.02); *G06F 17/50* (2013.01); *G06F 2217/04* (2013.01)

(58) Field of Classification Search
CPC .... G06F 3/1242; G06F 3/0482; G06F 3/1204; G06F 3/048; G06F 17/248; G06F 17/211
See application file for complete search history.

(56) References Cited

U.S. PATENT DOCUMENTS

| | | | | |
|---|---|---|---|---|
| 2008/0178073 A1* | 7/2008 | Gao | ........................ | G06F 17/24 715/243 |
| 2013/0227396 A1* | 8/2013 | Chinnathambi | ...... | G06F 17/212 715/235 |
| 2014/0297516 A1* | 10/2014 | Brown | ................ | G06F 3/04817 715/753 |
| 2016/0231914 A1* | 8/2016 | Sinn | ..................... | G06F 3/04847 |
| 2017/0091152 A1* | 3/2017 | Antipa | .................. | G06F 17/212 |

OTHER PUBLICATIONS

Pinegrow, "Pinegrow Walkthrough", Sep. 3, 2018, Youtube.com (Year: 2018).*
Florian Schulz, Designing with Ratio, Medium, https://medium.com/@getflourish/designing-with-ratio-dcc656d5385d, Oct. 21, 2018.
Tim Brown, "Typesetting Body Text," http://universaltypography.com/demo/, 2015.

* cited by examiner

*Primary Examiner* — Ariel Mercado
(74) *Attorney, Agent, or Firm* — Loeb & Loeb LLP

(57) ABSTRACT

Fluid design keyframes are markers used to illustrate and control design changes across the potentially infinite number of screen, device, and window sizes available in digital space. Currently, designers struggle to anticipate how their designs will function across these various sizes, which then causes them to inadequately build for all potential digital presentation possibilities. Through using fluid design keyframes, designers can present their designs with greater precision across these size variations. This invention will provide designers with a space to move through all the sizes in which a design might exist, as well as allowing them to see where aspects of their designs change as presentation sizes change and to exert control over those changes. Thusly, fluid design keyframes create a new and novel way for designers to interact with and present their work.

14 Claims, 9 Drawing Sheets

SYSTEM AND METHOD FOR CREATING FLUID DESIGN KEYFRAMES ON GRAPHICAL USER INTERFACE

FIELD OF THE INVENTION

Aspects of the invention generally relate to digital graphic design to be viewed on various screen sizes associated with electronic devices.

BACKGROUND

It is now commonplace for a consumer to own more than one electronic mobile device to browse the Internet or consume visual information and media transmitted over the Internet. For example, the consumer may own a mobile smartphone while also owning a tablet. Due to the different screen sizes for these devices, the consumer may prefer one device over another depending on situations and the contents that he or she is viewing.

It is also understood that the consumer may, from time to time, upgrade or replace his or her devices. These devices, which generally fit within a certain range of sizes, do have slightly different actual screen sizes. Data analytic firms, such as the International Data Corporation, frequently provide smartphone shipment projections or forecasts and generally categorize smartphone screen sizes in the following categories or ranges of screen sizes: 0 to 4 inches; 4 to 5 inches; 5 to 5.5 inches; 5.5 to 6 inches, and 6 to 7 inches.

While the consumer may not notice how these screen size variations, albeit slight, may affect how he or she views content, these variations may cause design problems for software developers who aim to present contents in the best visual rendering to the consumer. It is also true that the consumer may be accustomed to obtain contents from apps installed on the smartphone, but many apps are also retrieving contents directly from a web page, which may not scale well for the smartphone with a smaller screen size. In addition, sometimes apps installed on the smartphone have default text/font size that does not scale well according to the smartphone's operating system's settings. As such, it is still common for the consumer to have texts with disproportionate sizes. It is also another existing problem that the consumer may need to readjust text/font size among different apps, which further causes annoyance to the consumer. Moreover, many of the graphics or images, when scaled by the consumer on his or her devices, do not scale proportionally—resulting a distorted size or requiring the consumer to view the graphics or images in their original but non-scaled size.

SUMMARY

Aspects of the invention create a fluid design graphical user interface to aid contents designers to scale textual information to be dynamically adapted to different screen sizes using the entire width of a design space. Embodiments further enable the developers to easily update the web contents or even contents of the apps while reducing the need for the consumer to manually adjust text/font sizes on a per-device basis.

Embodiments of the invention generate key frame anchors, locks, or markers during designing phase for the contents. These anchors, locks, or markers enable the designers to set desirable scaling of the contents. Once the designers configure the desirable scaling, embodiments of the invention encode these anchors, locks, or markers as style characteristics in web programming language rendering framework, such as JAVASCRIPT, HTML, CSS, or XML, so that upon rendering by a rendering engine, the contents may be scaled as intended. Other mobile and desktop app developing language such as SWIFT, C++, Objective-C, C, and JAVA may also be used. In addition, another embodiments of the invention encode sizes among these anchors, locks, or markers in an animated transition such that consumers of the contents would not receive static rendering of all or portions of the contents on their devices. Moreover, aspects of the invention scale well for different or future screen sizes or form factors that may not have envisioned by the developers.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Figure 1:
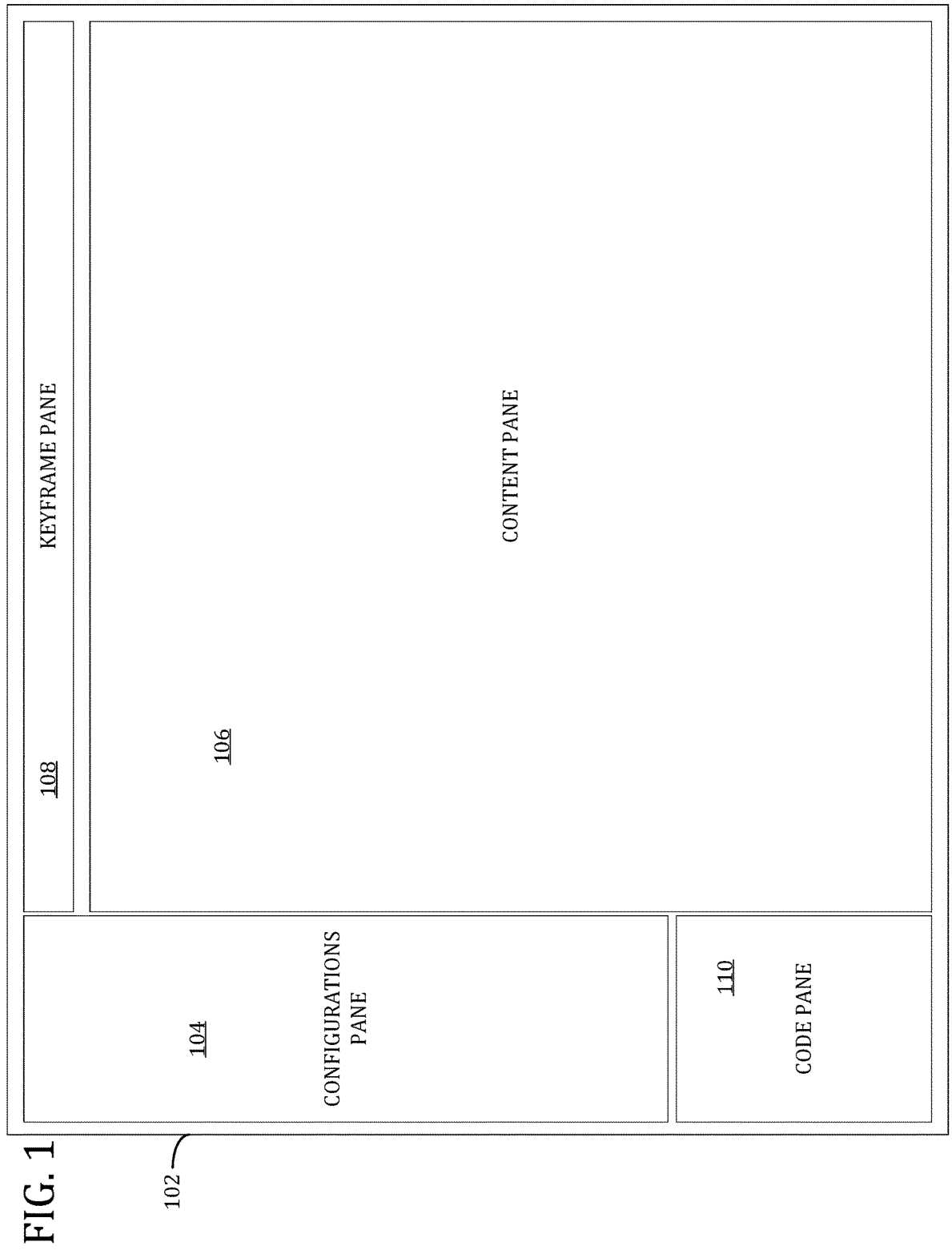
FIG. 1 is a screenshot of a graphical user interface (GUI) showing a page layout that may include a fluid design keyframe according to one embodiment of the invention.

The claimed system and method may address several technical problems and challenges, some of which are described. Referring now to FIG. 1, a screenshot of a graphical user interface (GUI) 102 shows a page layout of a fluid design keyframe according to one embodiment of the invention. In one embodiment, the GUI 102 may be presented on a number of capable computing devices (e.g., the device further illustrated in FIG. 7), such as a desktop connected with a display, a laptop, a smartphone, a tablet computer, or other computing devices that are capable of projecting contents onto a screen or a surface for users to interact with the contents. The GUI 102 further partitions or divides the display area to various parts, panels, or panes. For example, the GUI 102 provides a configurations pane 104, a content pane 106, a keyframe pane 108, and a code pane 110. It is to be understood that FIG. 1 merely shows an exemplary sizes or locations of these panes on the GUI 102, and they are not meant as a limitation.

Moreover, the different panes, such as the configurations pane 104, the content pane 106, the keyframe pane 108, and the code pane 110 may not be separate "windows" that either float or hover the GUI 102. In one embodiment, the GUI 102 displays a unified presentation and rendering of design and editing so that the user or developer may directly enter desirable contents in the content pane 106 and easily make updates/changes to the keyframe pane 108 and the configuration pane 104 without opening or closing windows. Unlike some of the prior approaches, the user or developer is required to enter contents in a "developer mode" and need to switch to a rendered or live mode. Also, sometimes prior practices are required to provide different and separate windows to provide functionalities to the user. However, these windows would block or obscure contents in the content area. This same GUI presentation and rendering of aspects of the invention provide technical effects by minimizing mistakes with hovered screens and windows of prior approaches that the user or developer would make (e.g., moving windows so as not to block or obscure contents behind the windows).

Figure 6:
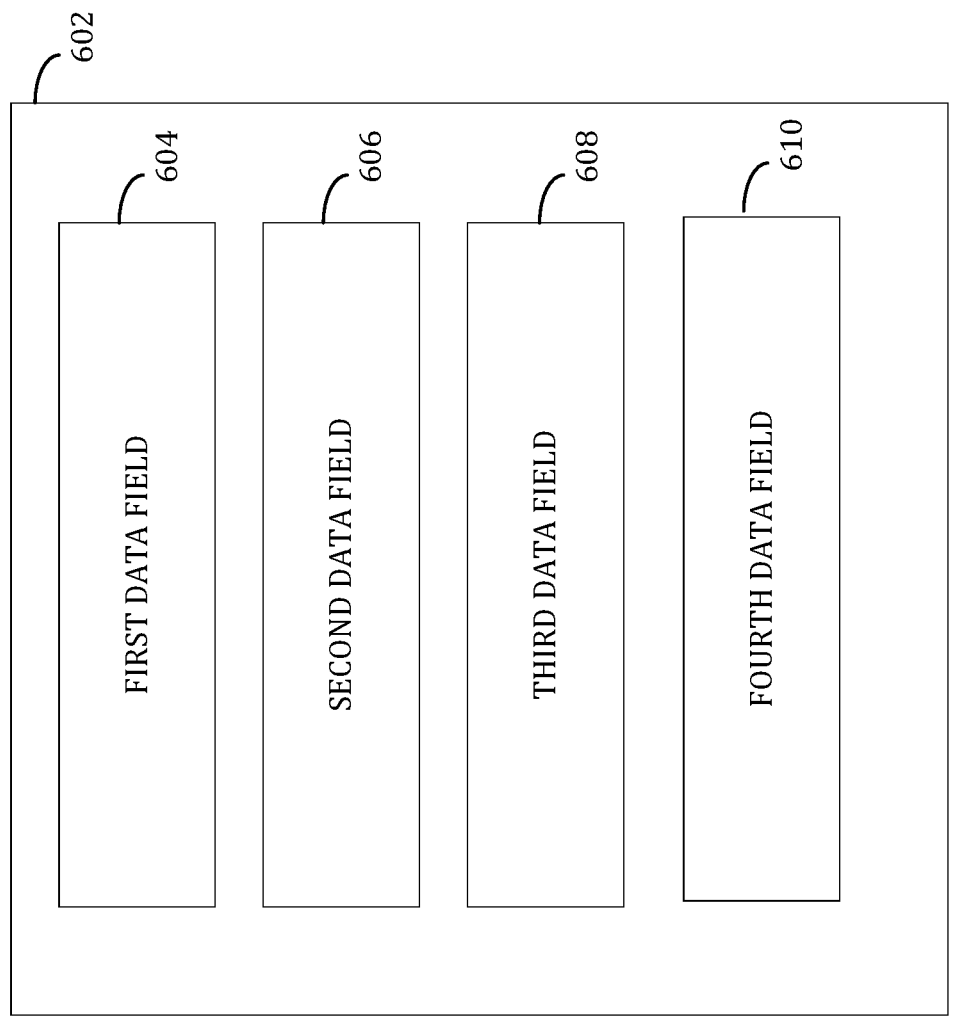
FIG. 6 is a diagram illustrating a data structure for providing a GUI method for a fluid design keyframe according to one embodiment of the invention.

Moreover, embodiments of the invention provide data structures for the GUI 102. For example, referring now to FIG. 6, a diagram illustrates a data structure 602 for providing the GUI 102 according to one embodiment of the invention. In one embodiment, a first data field 604 provides a data storage for information entered in the configurations pane 104, a second data field 606 provides a data storage for information entered in the content pane 106, a third data field 608 provides a data storage for information entered in the content pane 108, and a fourth data field 610 provides a data storage for information entered in the code pane 110. In one embodiment, the data structure 602 may be configured to be further stored in either permanent or temporary storage units of the computing device, depending on the memory management of the computing device.

Figure 2:
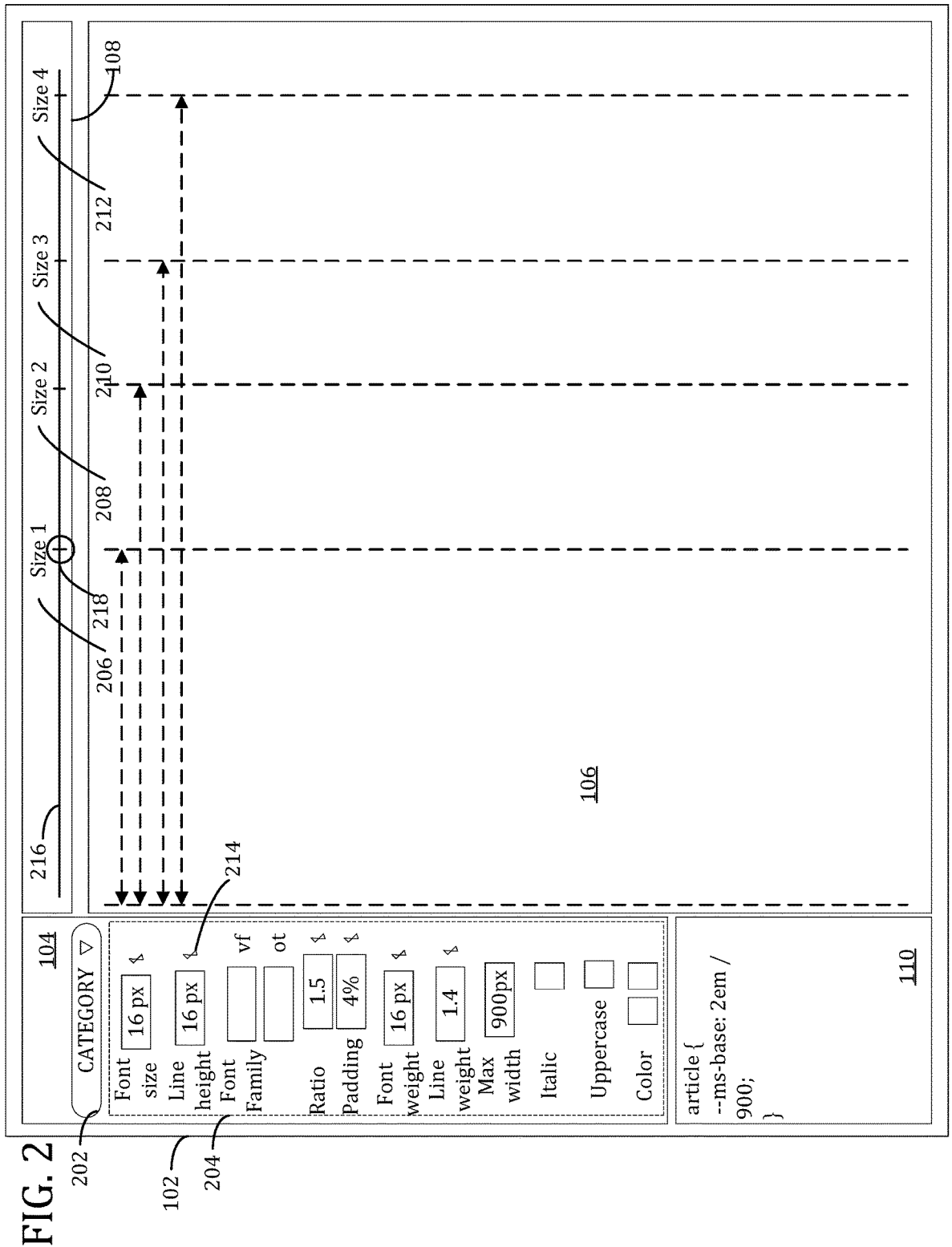
FIG. 2 is a screenshot of a GUI showing an exemplary GUI layout that may contain a fluid design keyframe according to one embodiment of the invention.
Figure 3:
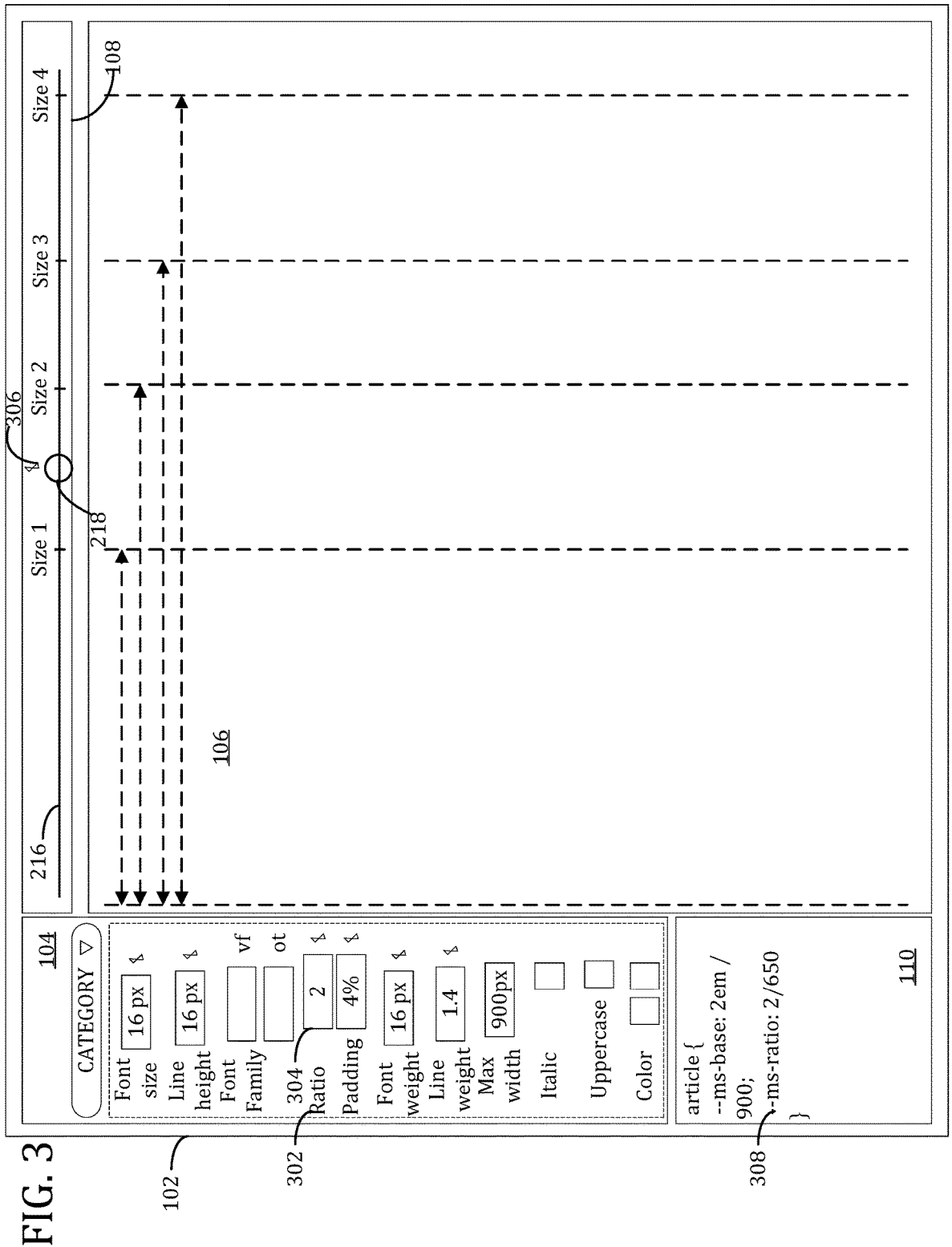
FIG. 3 is a screenshot of a GUI showing an exemplary layout having a marker or fluid design keyframe according to one embodiment of the invention.

Referring now to FIGS. 2 to 4, a series of screenshots illustrate the GUI 102 providing the layout and various aspects of the invention. Referring now to FIG. 2, the configurations pane 104 may be populated with a category configuration 202 and a modular configuration 204. In one example, the category configuration 202 may define one or more configuration settings and parameters in the modular configuration 204. For example, there may be the following categories to be available in the category configuration 202:

Article;
Paragraph;
Heading 1;
Heading 2;
Heading 3;
Heading 4;
Heading 5;
Heading 6;
Blockquote;
Ordered list;
Unordered list; and
List item.

It is to be understood that other categories may be added or provided, and the above examples are not meant as a limitation.

In another embodiment, the categories provided above may correspond to the contents that a user or developer wishes to provide in the content pane 106.

Using "Article" category as an example, aspects of the invention may provide the one or more configuration settings listed in the modular configuration 204. These modular configurations may include:

Font size;
Line height;
Font family;
Ratio;
Padding;
Font weight;
Line weight;
Max width;
Italic;
Uppercase; and
Color.

Again, it is to be understood that the above settings are meant as exemplary and not as limitations.

In one embodiment, some of the modular settings may include a marker 214 symbol, while others may not.

Still referring to FIG. 2, the code pane 110 may display dynamic coding or instructions in a desirable computing program language therein. In the example shown in FIG. 2, the code pane 110 may display a markup language code for contents of the category "Article" having the configurations in the configurations pane 104. In this example, without any configurations designated by the marker 214, the code pane 110 may show a somewhat default parameters or configurations as instructions for the "Article" content:

article {--ms-base: 2em/900;}

As it will be apparent when discussing FIGS. 3 and 4, the code pane 110 may provide dynamic information and coding as the developer or user make adjustments to the content in the content pane 106 with additional configurations.

FIG. 2 further shows a size bar 216 in the keyframe pane 108. In one example, the size bar 216 may provide reference points for different screen sizes or aspect ratio of mobile devices. In another embodiment, the size bar 216 may show a width of the screen of the mobile devices. In this example, the size bar 216 may show a point 206 representing a size 1, a point 208 representing a size 2, a point 210 representing a size 3, and a point 212 representing a size 4. In one embodiment, these points 206, 208, 210, and 212 may provide a rightmost edge of the display screen of these devices, given that the left margin of the content pane 106 represents the leftmost edge of the display screen of the devices. In another embodiment, these points 206, 208, 210, and 212 may represent a rightmost edge of a display space, and based on the edge, the developer may use that as a frame of reference to configure desirable rendering of the contents. In another embodiment, the GUI 102 may further provide an adjuster 218 to slide along the size bar 216 to obtain a preview of how the contents in the content pane 106 would appear based on a given size of the devices (as shown by the dashed lines and arrows in the content pane 106).

Referring now to FIG. 3, according to one embodiment, the GUI 102 may enable the developer or the user to easy configure specific rendering settings for the contents in the content pane 106. In this illustration and example, the developer may wish to add the marker 214 in a specific size location in the event that the user may wish to enlarge the contents or as an anticipation that there may be other screen sizes of devices becoming available. As such, the user may use a pointing device, such as a mouse, a stylus, the user's finger, or voice commands, to move the adjuster 218 to the desirable location. The user may next, in this example, enter the desirable configuration for the contents in the configurations pane 104. In this example, the user may desire to increase a Ratio setting/configuration 302 to "2" in 304.

As soon as, or substantially simultaneously, the user may enter the new configuration 304 in the configurations pane 104, the GUI 102 may display, in response to the new configuration 304, a marker or keyframe 306 near the size bar 216 to indicate that the user has added a new configuration at that particular size. Similarly, the GUI 102 may further display an updated coding or instructions 308 in the code pane 110 to reflect the added change. In another embodiment, the contents in the content pane 106 may also update to the desirable ratio in the rendering the result in the content pane 106.

As such, aspects of the invention may provide a dynamic and fluid tool to enable developers and users to easily and quickly make changes and can see the results of the changes. With the automatic coding or design instruction generation in the code pane 110, the developer or the user may easily copy and paste the code to an existing or previous version of the rendering code to update the content without the hassle of re-writing or recreating the update version. In addition, the user may not need to perform the actual coding itself; the coding or instruction generation in the code pane 110 may be substantially automatic, and the coding language syntax may be configured as well.

Figure 4A:
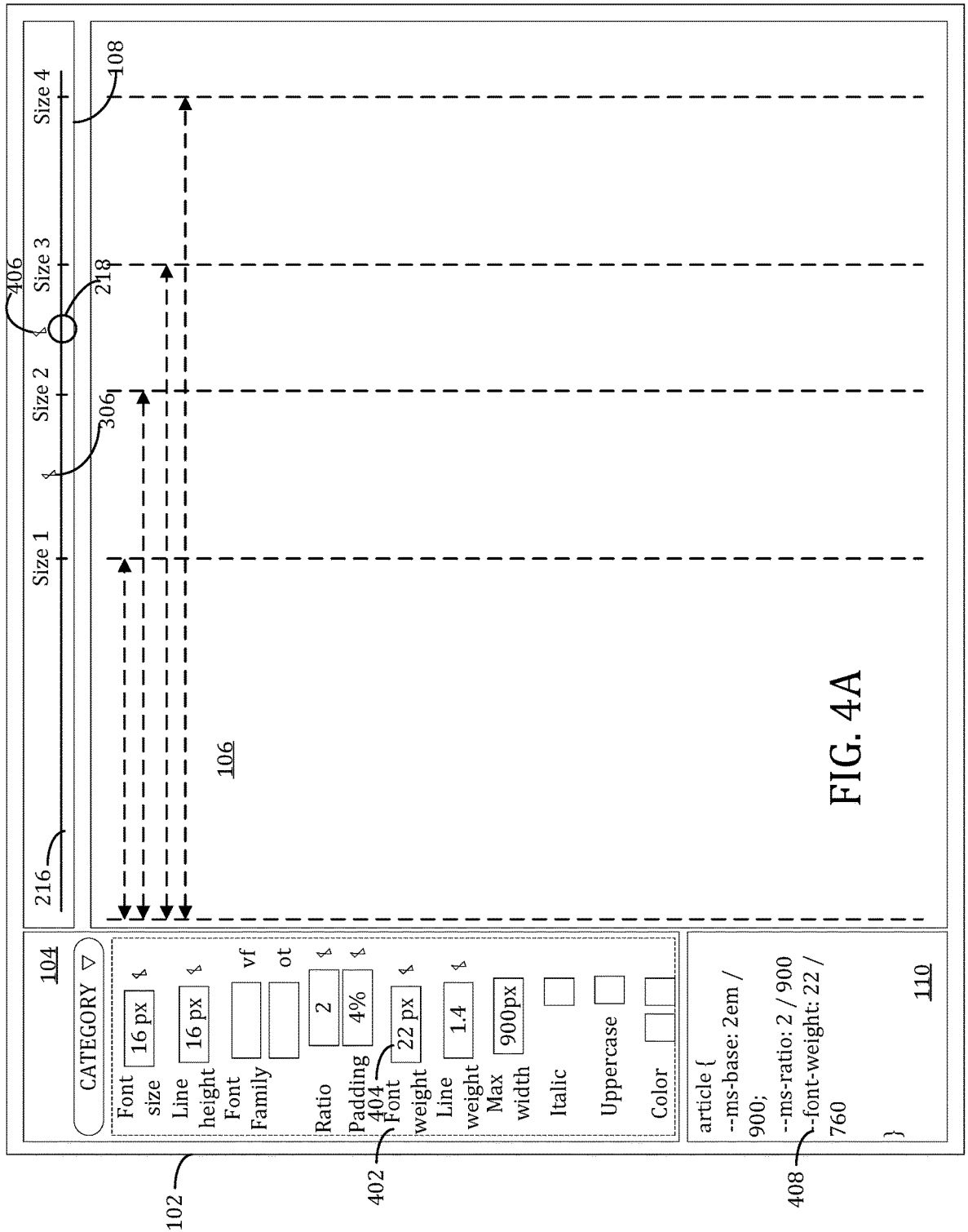
FIG. 4A is a screenshot of a GUI showing an exemplary layout having two markers or fluid design keyframes according to one embodiment of the invention.

Referring now to FIG. 4A, embodiments of the invention may enable the GUI 102 to add a further configuration to the content. Again, as similar to FIG. 3, the user may slide the adjuster 218 to another desirable location along the size bar 216. In this example, the user may wish to enlarge the font at a certain size to highlight the contents. As such, the user may wish to slide the adjuster 218 to a second location and, next, enter the desirable font weight in the font weight configuration 402 with the desirable value 404. In this example, the desirable value 404 is "22." The GUI 102 next, in this embodiment, may show a marker or keyframe 406 at the location of the adjuster 218 and also updates the code pane 110 by adding a new line of code 408 to reflect the new configuration.

Aspects of the invention may further provide the GUI 102 to be dynamic in the sense that if the user wishes to remove a previously entered configuration, the GUI 102 may easily reflect the removal without requiring the user to start over the process from the beginning.

Aspects of the invention may encapsulate all design variations across a variety of display sizes. As illustrated above, the size bar and the points thereon representing the device sizes may be displayed along an edge of an area with the design the user is working on. As the user makes design characteristic changes, value markers may appear at the display size you are working at. As the user changes the display size by sliding or dragging adjuster 218, then the adjuster 218 may indicate a new display size. When working at the new display size, new value markers may be added to the design at this location along the ruler. When the adjuster is moved between the two known device sizes, the design characteristic may be a state in-between the two known sizes. Any number of new markers may be added to the size bar. In one embodiment, if the adjuster is before the first known device size or after the last known device size, then the design characteristic may be configured to be the same as specified in the closest known sizes.

Embodiments of the invention may establish a relationship to how an object or design characteristic may change across screen sizes. Aspects of the invention may provide the GUI 102 to have real-time or animated feedback of the contents in the content pane 106 as the user slide or drag the adjuster 218 across the size bar which may enable the user to visualize changes in the overall scale of the design of the contents in the content pane 106.

Moreover, aspects of the invention may interpolate between two markers, points, anchors, or keyframes. Interpolation may include the transition from a first state into another state and can be linear or eased. Easing may mean that the transition from one state into another can happen more rapidly or more slowly at different moments during the transition.

Figure 4B:
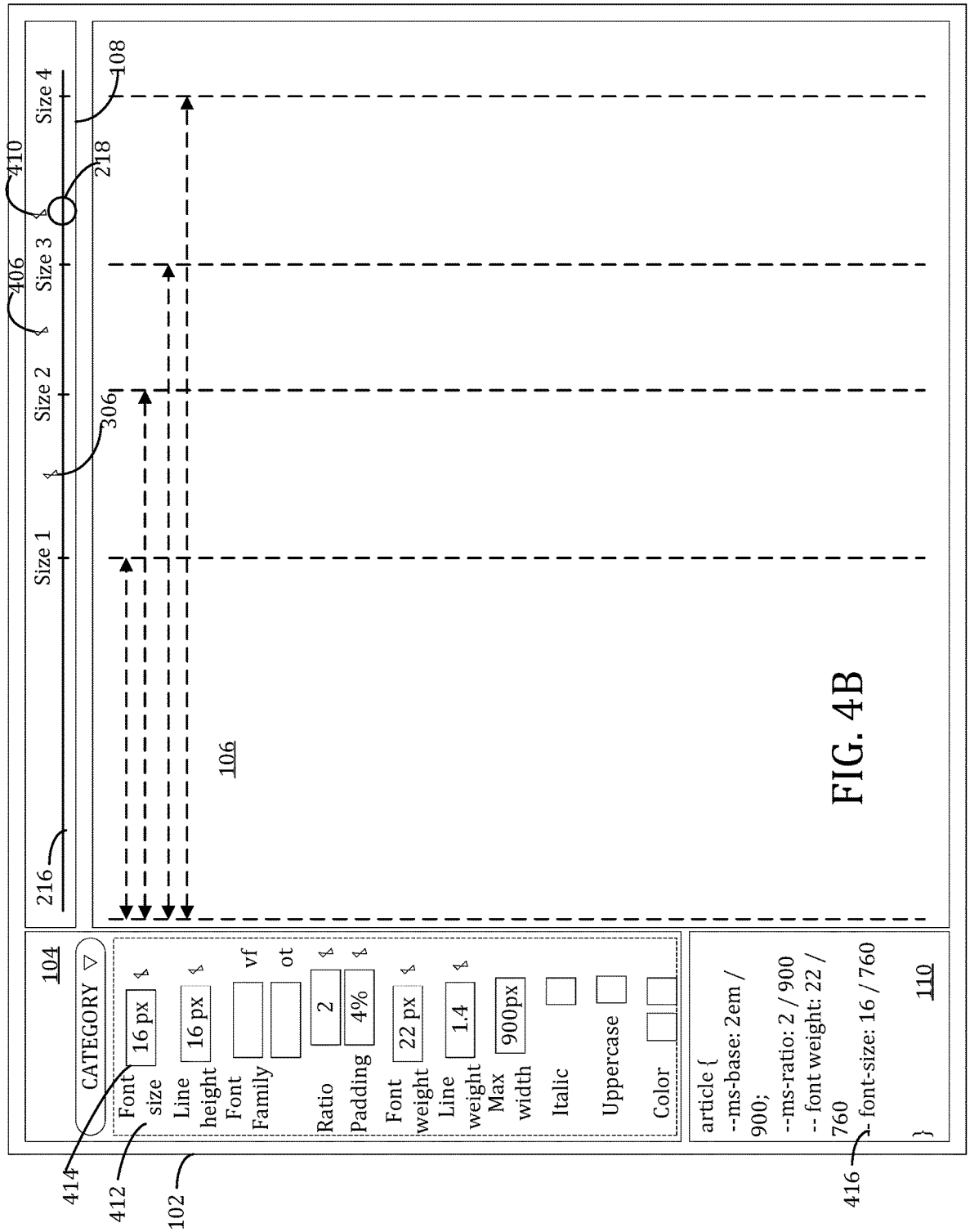
FIG. 4B is another screenshot of a GUI showing an exemplary layout having three markers or fluid design keyframes according to one embodiment of the invention.

Referring now to FIG. 4B, another layout on the GUI 102 shows three markers or keyframes according to one embodiment of the invention. Unlike FIGS. 3 and 4A, the user or developer may directly set a configuration in the configurations pane 104 by sliding or dragging the adjuster 218 along the size bar 218. For example, the user or developer may slide or drag the adjuster 218 to a new position. According to one embodiment, the GUI 102 may recognize the position as a new marker or keyframe 410. Almost substantially simultaneous, the GUI 102 displays a new configuration 412 as a new "Font" configuration and a new configuration value 414 for the "Font" size "16". Similarly, as illustrated previously, the codes pane 110 may display a new lines of code or instructions 416 to reflect the new configuration 414.

Alternative embodiments of the invention may further enable flexibly accommodate user's use of the adjuster 218. In one example, the user may wish to set a screen size, even arbitrarily, using the adjuster 218 somewhere else along the size bar 216 in the GUI 102. This new position may not be related to existing or known sizes. As such, the position of the adjuster 218 along the size bar 216 may become a marker or indicator of a screen size that the user is designing for. In one embodiment, the size bar 216 may define a plurality of sizes using the entire width of the design space provided by the GUI 102.

In a further embodiment, the GUI 102 may initially position the adjuster 218 in a default position. In another embodiment, if the user or developer enters a configuration value that matches an existing or a known size, the marker or keyframe 306, 406, or 410 may be displayed. In a further embodiment, when a configuration value is added, a marker or keyframe may be displayed even if it is the only value (that is, there are no other markers or points as those points for the size 206, 208, 210, or 212).

In a further embodiment, the GUI 102 may display a closest value when the user or developer slides or drags the adjuster 218 away from a value. In one embodiment, the GUI 102 may display such value near or hover over the adjuster 218. In an alternative embodiment, when the adjuster 218 may be between two markers or keyframes, the GUI 102 may also display or interpolate values between the two makers or keyframes.

In a further embodiment, when the adjuster 218 may be positioned to the left of the leftmost marker or keyframe, or to the right of the rightmost marker or the keyframe, the GUI 218 may immediately recognize the position of the adjuster 218, but, instead of displaying the configuration value of the position of the adjuster 218, the GUI 218 may actually display the configuration value of the leftmost marker or keyframe or the configuration of the rightmost marker or keyframe.

Figure 5:
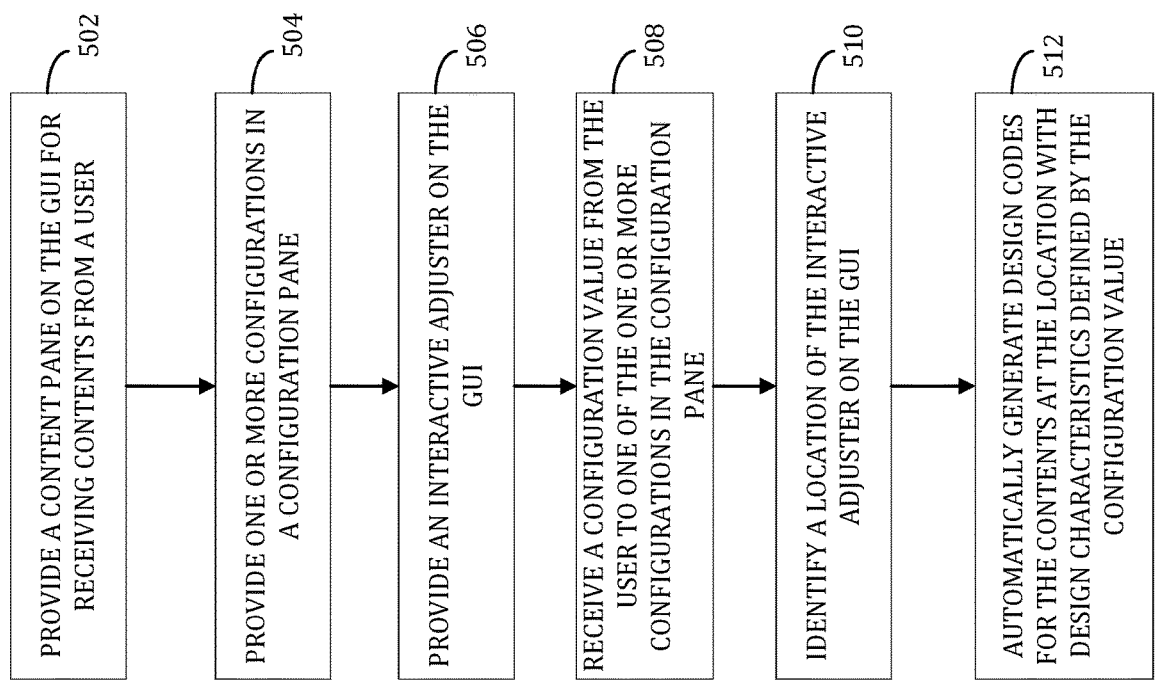
FIG. 5 is a flowchart illustrating a computerized method for a fluid design keyframe according to one embodiment of the invention.

Referring now to FIG. 5, a flowchart illustrates a computerized method for a fluid design keyframe according to one embodiment of the invention. In one embodiment, a computing device having a processor may execute computer-executable instructions to, At 502, a content pane on a graphical user interface may be provided, such as the GUI 102, for receiving contents from a user. For example, the contents may be text contents for a webpage with images or graphics. In another example, the contents may be presented for or on an app to be installed on a mobile device. At 504, the computing device may further provide one or more configurations in a configuration pane. In one embodiment, the configuration pane may be positioned separately from the content pane. In another example, the one or more configurations may define one or more design characteristics of the contents.

At 506, the computing device may provide an interactive adjuster on the GUI. In one aspect, in response to inputs from the user, the interactive adjuster may slide across a width of the GUI. Further, at 508, the computing device may receive a configuration value from the user to one of the one or more configurations in the configuration pane. In one example, the configuration value may represent a change to existing configuration values of the contents currently displayed in the content pane. For example, the change may relate to size of fonts in the contents at a certain screen size. In another example, the change may be an overall enlargement of contents in the content pane. At 510, the computing device may identify a location of the interactive adjuster on the GUI. At 512, the computing device may automatically generate design codes for the contents at the location with design characteristics defined by the configuration value.

Figure 7:
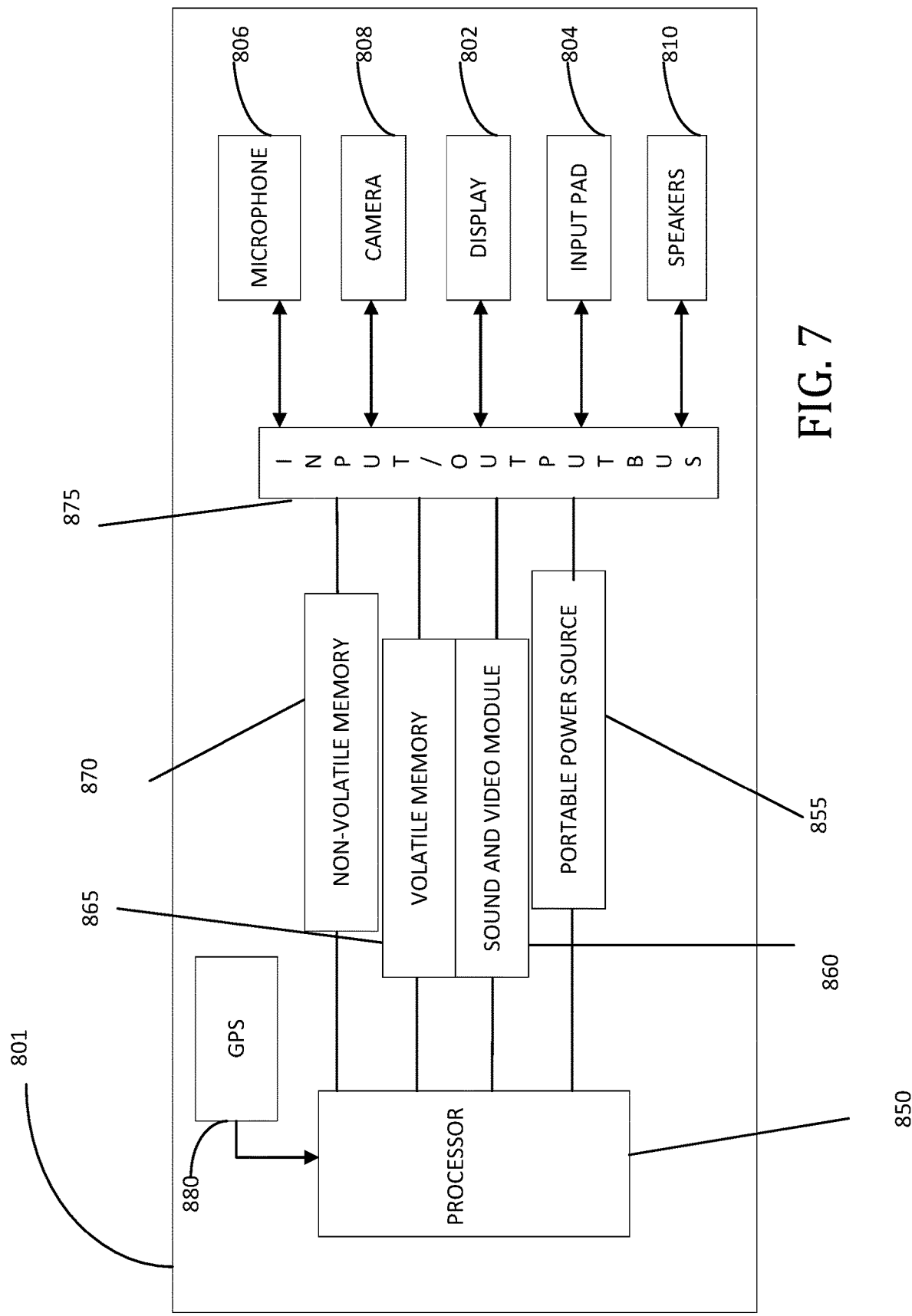
FIG. 7 is an illustration of a portable computing device suitable for aspects of the invention.

FIG. 7 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), BLUETOOTH®, cellular communication or near field communication devices. The communication may be direct to the computing device 841 or may be through a communication network 102 such as cellular service, through the Internet, through a private network, through BLUETOOTH®, etc. FIG. 7 may be a simplified illustration of the physical elements that make up a portable computing device 801 and FIG. 8 may be a simplified illustration of the physical elements that make up a server type computing device 841.

FIG. 7 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

Figure 8:
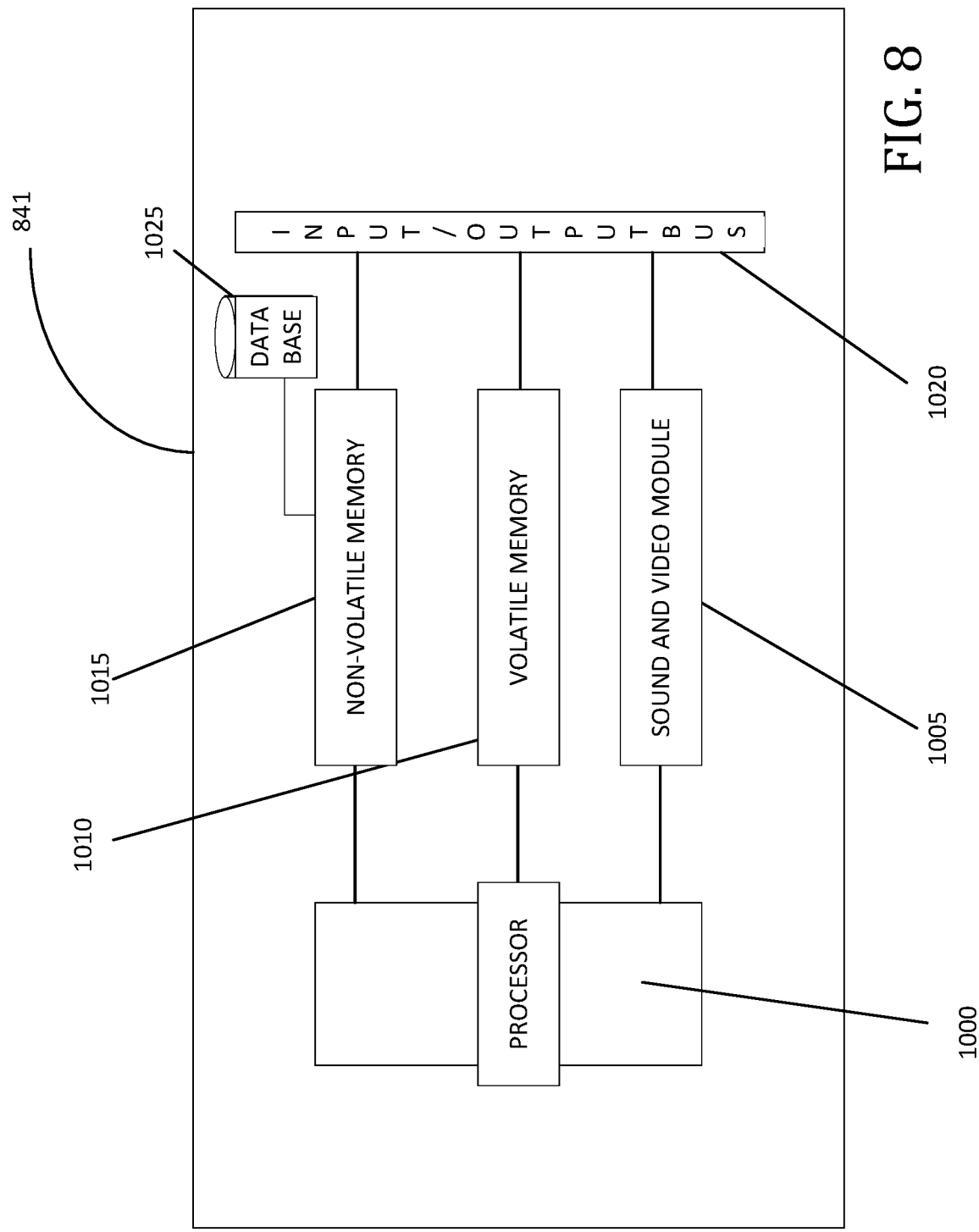
FIG. 8 is an illustration of a server computing device suitable for aspects of the invention.

The physical elements that make up the remote computing device 841 may be further illustrated in FIG. 8. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as those designed from the Intel® Corporation, AMD®, Qualcomm®, ARM®, MediaTek®, or Motorola®); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC OS®, Windows (XP®, VISTA®, etc.), iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, JAVA, C++, or PERL using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving user transaction systems. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized method for providing a graphical user interface (GUI) for a fluid design keyframe comprising:
   providing a content pane on the GUI for receiving contents from a user, said content pane being free from predetermined grid lines;
   providing one or more configurations in a configuration pane, said configuration pane being separate from the content pane, said one or more configurations defining one or more design characteristics of the contents;
   providing a size bar across a width defined by the content pane;
   providing an interactive adjuster along the size bar across the width of the GUI;
   receiving a first configuration value from the user to one of the one or more configurations in the configuration pane;
   identifying a first location of the interactive adjuster on the size bar in response to inputs from the user;
   providing a first marker on the location of the interactive adjuster along the size bar;
   rendering the contents in the content pane according to the first configuration value at the first marker;
   receiving an instruction from the user to adjust the interactive adjuster to a second location along the size bar;
   receiving a second configuration value from the user to the one of the one or more configurations in the configuration pane, said first configuration value being different from the second configuration value;
   rendering the contents in the content pane according to the second configuration value at the second marker; and
   transitioning the contents in real-time as a function of the first configuration value and the second configuration value in response to user's dynamic input to move the interactive adjuster between the first marker and the second marker, while maintaining the contents in their entirety within a leftmost margin and a dynamic position of the interactive adjuster corresponding to the dynamic input.

2. The computerized method of claim 1, wherein the interactive adjuster slides along the size bar in response to the inputs from the user.

3. The computerized method of claim 1, further comprising generating design instructions in a code pane.

4. The computerized method of claim 3, wherein the generated design instructions comprise markup programming language.

5. The computerized method of claim 1, further comprising assigning points along the size bar, said points representing known screen sizes of computing devices.

6. A tangible non-transitory computer readable medium having stored thereon computer-executable instructions for a fluid design keyframe, said computer-executable instructions comprising:
   providing a content pane on a graphical user interface (GUI) for receiving contents from a user, said content pane being free from predetermined grid lines;
   providing one or more configurations in a configuration pane, said configuration pane being separate from the content pane, said one or more configurations defining one or more design characteristics of the contents;
   providing a size bar across a width defined by the content pane;
   providing an interactive adjuster along the size bar across the width of the GUI;
   receiving a first configuration value from the user to one of the one or more configurations in the configuration pane;
   identifying a first location of the interactive adjuster on the size bar in response to inputs from the user;
   providing a first marker on the location of the interactive adjuster along the size bar;
   rendering the contents in the content pane according to the first configuration value at the first marker;
   receiving an instruction from the user to adjust the interactive adjuster to a second location along the size bar;
   receiving a second configuration value from the user to the one of the one or more configurations in the configuration pane, said first configuration value being different from the second configuration value;
   rendering the contents in the content pane according to the second configuration value at the second marker; and
   transitioning the contents in real-time as a function of the first configuration value and the second configuration value in response to user's dynamic input to move the interactive adjuster between the first marker and the second marker, while maintaining the contents in their entirety within a leftmost margin and a dynamic position of the interactive adjuster corresponding to the dynamic input.

7. The tangible non-transitory computer readable medium of claim 6, further comprising generating design instructions in a code pane.

8. The tangible non-transitory computer readable medium of claim 7, wherein the generated design instructions comprise markup programming language.

9. The tangible non-transitory computer readable medium of claim 6, wherein the interactive adjuster slides along the size bar in response to the inputs from the user.

10. The tangible non-transitory computer readable medium of claim 6, further comprising assigning points along the size bar, said points representing known widths of computing devices.

11. A system for providing a fluid design keyframe comprising:
    a processor configured to execute computer-executable instructions stored in a memory accessible by the processor;
    an input and output device for interact with a user;
    a display, in response to computer-executable instructions executed by the processor, for displaying information thereon;
    wherein the processor is configured to execute computer-executable instructions for:
    providing a content pane on a graphical user interface (GUI) on the display for receiving contents from a user, said content pane being free from predetermined grid lines;
    providing one or more configurations in a configuration pane on the GUI, said configuration pane being separate from the content pane, said one or more configurations defining one or more design characteristics of the contents;
    providing a size bar across a width defined by the content pane;
    providing an interactive adjuster along the size bar across the width of the GUI;

receiving a first configuration value from the user to one of the one or more configurations in the configuration pane;

identifying a first location of the interactive adjuster on the GUI;

providing a first marker on the location of the interactive adjuster along the size bar;

rendering the contents in the content pane according to the first configuration value at the first marker;

receiving an instruction from the user to adjust the interactive adjuster to a second location along the size bar;

receiving a second configuration value from the user to the one of the one or more configurations in the configuration pane, said first configuration value being different from the second configuration value;

rendering the contents in the content pane according to the second configuration value at the second marker; and transitioning the contents in real-time as a function of the first configuration value and the second configuration value in response to user's dynamic input to move the interactive adjuster between the first marker and the second marker while maintaining the contents in their entirety within a leftmost margin and a dynamic position of the interactive adjuster corresponding to the dynamic input.

12. The system of claim 11, further comprising generating design instructions in a code pane.

13. The system of claim 11, wherein the interactive adjuster slides along the size bar in response to the inputs from the user.

14. The system of claim 11, further comprising assigning points along the size bar, said points representing known widths of computing devices.

* * * * *